United States Patent
Makinson et al.

(10) Patent No.: US 11,165,078 B2
(45) Date of Patent: Nov. 2, 2021

(54) GENERATOR UNIT HAVING A FUEL CELL DEVICE, VEHICLE HAVING A GENERATOR UNIT OF THIS TYPE AND METHOD FOR MONITORING A GENERATOR UNIT

(71) Applicants: AVL List GmbH, Graz (AT); Nissan Motor Co., Ltd., Yokohama (JP)

(72) Inventors: Julian Makinson, Graz (AT); Michael Reissig, Graz (AT); Jörg Mathé, Graz (AT); Robert Pöschl, Judendorf-Strassengel (AT); Daiki Tanaka, Kawasaki (JP)

(73) Assignees: AVL List GmbH, Graz (AT); Nissan Motor Co., Ltd., Yokohama (JP)

( * ) Notice: Subject to any disclaimer, the term of this patent is extended or adjusted under 35 U.S.C. 154(b) by 310 days.

(21) Appl. No.: 16/322,968

(22) PCT Filed: Aug. 2, 2017

(86) PCT No.: PCT/EP2017/069539
§ 371 (c)(1),
(2) Date: Feb. 4, 2019

(87) PCT Pub. No.: WO2018/024774
PCT Pub. Date: Feb. 8, 2018

(65) Prior Publication Data
US 2019/0190044 A1     Jun. 20, 2019

(30) Foreign Application Priority Data
Aug. 2, 2016  (AT) ............... A 50702/2016

(51) Int. Cl.
*H01M 8/04664* (2016.01)
*H01M 8/0606* (2016.01)
(Continued)

(52) U.S. Cl.
CPC ......... *H01M 8/04679* (2013.01); *B60L 50/72* (2019.02); *H01M 8/04014* (2013.01);
(Continued)

(58) Field of Classification Search
CPC ............... B60L 50/72; H01M 2250/20; H01M 8/04014; H01M 8/0444; H01M 8/04679; H01M 8/0606; Y02E 60/50; Y02E 90/40
See application file for complete search history.

(56) References Cited

U.S. PATENT DOCUMENTS

2007/0077463 A1*  4/2007  Adams .............. H01M 8/04208
                                                              137/210
2013/0034795 A1   2/2013  Matsumoto et al.

FOREIGN PATENT DOCUMENTS

CN       101274652        10/2008
CN       103674445         3/2014
(Continued)

OTHER PUBLICATIONS

Communication Pursuant to Article 94(3) EPC dated Feb. 3, 2020 From the European Patent Office Re. Application No. 17746494.8. (6 Pages).
(Continued)

*Primary Examiner* — Victoria H Lynch

(57) ABSTRACT

The present invention relates to a generator unit (1) having a housing (10), a fuel cell device (20), which is arranged in an interior space (10*a*) of the housing (10), a gas-carrying duct (30) having an upstream opening (30*a*) and a downstream opening (30*b*), a valve (40), which is provided, in particular set up, to connect the interior space (10*a*) to the duct (30) at least at times in a gas-carrying manner, a driving device (50), which moves gas within the duct (30) from the upstream opening (30*a*) to the downstream opening (30*b*), and a sensor device (60), which is arranged in a downstream direction of the duct (30) starting from the valve (40) and is designed to detect at least one parameter of the gas. The present invention also relates to a method for monitoring a generator unit.

18 Claims, 1 Drawing Sheet

(51) Int. Cl.
    *H01M 8/0444*     (2016.01)
    *B60L 50/72*     (2019.01)
    *H01M 8/04014*     (2016.01)

(52) U.S. Cl.
    CPC ....... *H01M 8/0444* (2013.01); *H01M 8/0606* (2013.01); *H01M 2250/20* (2013.01); *Y02T 90/40* (2013.01)

(56) References Cited

FOREIGN PATENT DOCUMENTS

| | | |
|---|---|---|
| EP | 2963715 | 1/2016 |
| JP | 2007-311222 | 11/2007 |
| JP | 2016-12529 | 1/2016 |
| WO | WO 2012/128368 | 9/2012 |

OTHER PUBLICATIONS

International Search Report and the Written Opinion dated the International Searching Authority Re. Application No. PCT/UP2017/069539. (10 Pages).

* cited by examiner

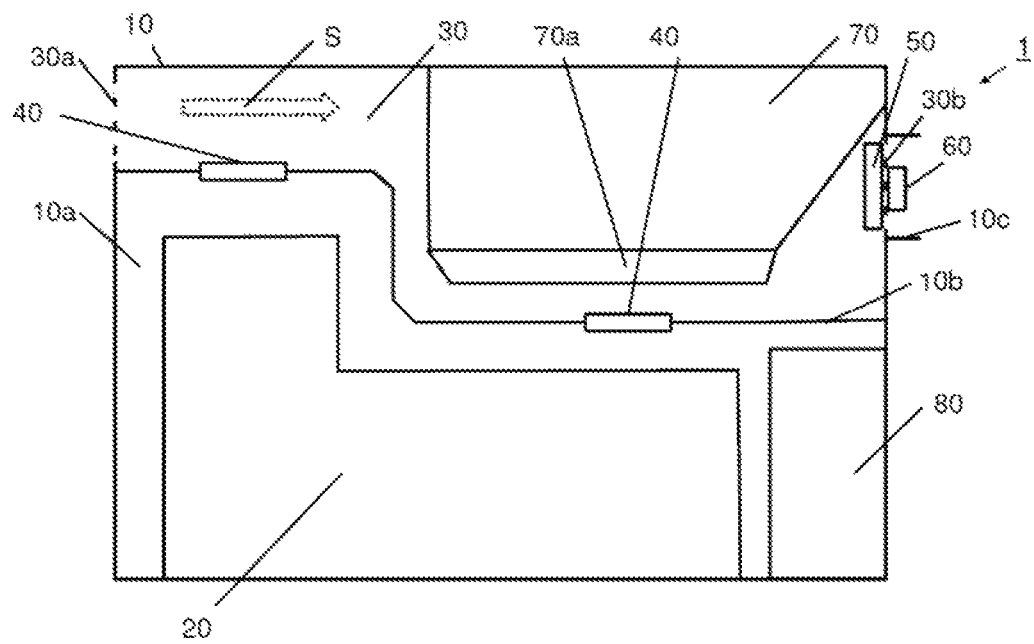

GENERATOR UNIT HAVING A FUEL CELL DEVICE, VEHICLE HAVING A GENERATOR UNIT OF THIS TYPE AND METHOD FOR MONITORING A GENERATOR UNIT

RELATED APPLICATIONS

This application is a National Phase of PCT Patent Application No. PCT/EP2017/069539 having International filing date of Aug. 2, 2017, which claims the benefit of priority of Austrian Patent Application No. A 50702/2016 filed on Aug. 2, 2016. The contents of the above applications are all incorporated by reference as if fully set forth herein in their entirety.

FIELD AND BACKGROUND OF THE INVENTION

The present invention relates to a generator unit having a fuel cell device, a vehicle having a generator unit of this type and a method for monitoring a generator unit.

A generator unit of this type can, for example, be used in a land-bound vehicle, such as a personal motor vehicle and/or truck, as a component of the primary drive. According to a preferred embodiment, fuel, in particular bio-ethanol and/or water mixed with ethanol, is supplied to the generator unit, which generates electrical energy from this. The generated electrical energy is, at least partially, in particular via an interposed battery, supplied to an electrical drive, which preferably drives at least one of the wheels of the vehicle.

An additional preferred use of the generator unit according to the invention is a so-called auxiliary power unit (APU), as used for example, among other things, in land-bound vehicles, such as personal motor vehicles and/or trucks, in particular to provide electrical power for on-board systems when the drive system, for example an internal combustion engine having a connected alternator, is switched off.

Fuel cells have been known in theory since the middle of the 19th century. A fuel cell is a galvanic cell that converts the chemical reaction energy of a continually supplied fuel and an oxidant into electrical energy. This may also be referred to as so-called "cold combustion."

The use of this technology in automobiles has been the subject of research by a plurality of automotive companies for more than 20 years. Conventional fuel cells generally use gaseous hydrogen as fuel for the fuel cell. The intrinsic properties of hydrogen, in particular its volatility and combustibility or explosiveness, make it necessary to take special measures to detect a possible hydrogen leak in a fuel cell to, if necessary, initiate countermeasures in time.

A fuel cell system having a fuel cell stack integrated in a housing is disclosed in DE 10 2014 200 838 A1. This fuel cell stack is arranged in a housing that is for the most part closed off at least upwards. Air flow is generated within the housing via a fan attached to the outside of the housing. A hydrogen sensor is also arranged in the housing, which detects the hydrogen content of the air flowing past. If hydrogen escapes from the fuel cell stack, the hydrogen is entrained by the flowing ambient air and supplied to the hydrogen sensor, which detects it with regard to its quantity.

SUMMARY OF THE INVENTION

It is an object of the present invention to provide an improved generator unit having a fuel cell. In particular, the generator unit is to be improved with regard to robustness, in particular leak-tightness.

This object is achieved by a generator unit according to claim 1, a vehicle according to claim 15 and by a method according to claim 17. The features of the advantageous embodiments described in the following can be combined with one another as desired, unless this is explicitly excluded. In particular, the features and advantages described with respect to a first aspect of the invention also apply to other aspects of the invention and its advantageous embodiments and vice versa.

A first aspect of the present invention relates to a generator unit having a housing, a fuel cell device, which is arranged in a interior space of the housing, a gas for a duct having an upstream opening and a downstream opening, a valve, which is provided, in particular set up, to connect an interior space of the fuel cell device to the duct in a gas-carrying manner, a driving device, which moves gas within the duct from the upstream opening to the downstream opening, and a sensor device, which is arranged in a downstream direction of the duct starting from the valve and is designed to detect at least one parameter of the gas.

A preferred use of the generator unit according to the invention is in a land-bound vehicle, such as a personal motor vehicle and/or truck, as an auxiliary power unit (APU), in particular to provide electrical power for on-board systems when the drive system, for example an internal combustion engine with a connected alternator, is switched off.

Another preferred use of the generator unit according to the invention is in a land-bound vehicle, such as a personal motor vehicle and/or truck, as a component of the primary drive. The electrical energy produced is used at least in part for driving the vehicle.

The present invention is in particular based on the idea of how to prevent and/or detect an uncontrolled leak of gas from a generator unit with fuel cell and/or how to react to this. Preferably, the fuel cell device of the generator unit according to the invention is therefore encased, at least for the most part, in a gas-tight manner up to the valve. The valve, which preferably opens only if an increase in pressure in the interior space of the housing causes it to do so, preferably seals the interior space in turn, at least for the most part, completely against gaseous, liquid or solid environmental influences, such as water, dust or dirt. If a gas, in particular hydrogen, escapes from the fuel cell device, this preferably increases the pressure in the interior space, which causes the valve to open and the gas to be discharged into the gas-carrying duct. Due to the driving device, the gas that has escaped from the interior space is preferably carried along with the gas carried in the gas-carrying duct, in particular ambient air, and moved toward the sensor device. The sensor device preferably detects at least one parameter of the gas, in particular a hydrogen content thereof, and outputs the detected parameter to a control device for evaluation, which is preferably then capable of acting on the fuel cell device.

This is particularly advantageous because in this manner, improved resistance to environmental influences, in particular gaseous, liquid or solid environmental influences, is achieved. This is achieved in particular by virtue of the fact that the fuel cell device is generally closed off in an airtight manner and is only connected in a gas-carrying manner to its surroundings, in particular to the gas-carrying duct, when the internal pressure in the interior space exceeds a predetermined limit value. Due to this design, it is also advantageous that the fuel cell device, in particular its components, must be designed to be less robust against the aforementioned environmental influences than is known of solutions from the prior art.

This is also particularly advantageous because in this way passengers of a vehicle are better protected against dangerous, in particular combustible and/or explosive, gases, in particular hydrogen, before and/or during and/or after a trip. This is done in particular via the, at least for the most part, gas-tight containment of the fuel cell in the housing, as a result of which an uncontrolled leak of gas, in particular into a passenger compartment of a vehicle, is reduced, in particular, at least for the most part, prevented. In the event that gas escapes from the fuel cell device, this is detected by the generator unit according to the invention, at least for the most part, promptly and/or, at least for the most part, reliably such that countermeasures, in particular switching off the generator unit and/or shutting down the vehicle, can be initiated, in particular before a risk arises for the passengers and/or the vehicle.

According to one embodiment, the generated air flow additionally serves to cool at least one component of the fuel cell, which, as is known, can reach temperatures of several hundred degrees Celsius during operation.

A "generator unit" within the meaning of the present invention should be understood in particular as a device that provides electrical energy. A generator unit in the sense of the present invention is in particular an APU, which provides electrical energy in a vehicle if the primary drive is switched off.

Within the meaning of the present invention, a "housing" refers in particular to a device that has a cavity in which additional components can be arranged, which the device combines to form a structural unit and/or shields against external, in particular gaseous and/or liquid and/or solid environmental influences. The housing of the present invention is particularly preferably formed of a metal material, in particular a sheet-like metal material, in particular a steel or aluminum alloy, and is manufactured in a primary-forming and/or re-forming and/or machining manner. A "housing" within the meaning of the present invention has, according to one embodiment, a plurality of areas and/or interior spaces that are separated from each other, in particular in an, at least for the most part, fluid-tight manner, in particular in an, at least for the most part, gas-tight manner.

A "fuel cell device" within the meaning of the present invention is in particular a device that by means of a chemical reaction converts a continuously supplied fuel into electrical energy as a result of a cold combustion. Included in this definition in particular are alkaline fuel cells (AFC), polymer electrolyte fuel cells (PEMFC), direct methanol fuel cells (DMFC), formic acid fuel cells, in particular—depending on the embodiment—having platinum and/or palladium, and/or ruthenium catalysts, phosphoric acid fuel cells (PAFC), molten carbonate fuel cells (MCFC), solid oxide fuel cells (SOFC), direct carbon fuel cells (SOFC, MCFC) and magnesium-air fuel cells (MAFC). In particular for application as an APU, the solid oxygen fuel cell mentioned above is preferably used that is in particular a high-temperature fuel cell having an operating temperature of 650 to 1000° C. According to one embodiment, the electrolyte in this type of cell comprises a solid ceramic material that can conduct oxygen ions and simultaneously has an insulating effect for electrons. One side of the electrolyte layer has a cathode arranged on it and the other side of the electrolyte layer has an anode arranged on it. Cathodes and anodes are preferably designed as gas-permeable electrical conductors. According to a preferred embodiment, the anode is supplied with fuel, in particular bio-ethanol and/or water mixed with ethanol, in particular bio-ethanol, and/or a gas mixture created therefrom. The oxygen-ion-conduction electrolyte is preferably provided as a thin membrane to be able to transport the oxygen ions using minimal energy. This works especially well at high temperatures. The outer side of the cathode facing away from the electrolyte is surrounded by air; the outer side of the anode by fuel gas. Unused air and unused fuel gas, as well as combustion products, are preferably suctioned off.

The operation of the fuel cell is based on the redox reaction, in which the reduction and oxidation take place in physical separation, specifically at the boundary between anode and electrolyte or between electrolyte and cathode. In the SOFC, this redox reaction is preferably a reaction of oxygen with the fuel, in particular hydrogen or carbon monoxide. On the cathode side, there is preferably an excess of oxygen, while on the anode side there is a shortage of oxygen, because the oxygen that is present immediately reacts with the fuel, for example, with the hydrogen. Because of this concentration gradient, the oxygen diffuses from the cathode to the anode. However, because the electrolyte in between is permeable only for oxygen ions, the oxygen molecule picks up two electrons at the boundary between cathode and electrolyte, whereby it becomes an ion and can penetrate the barrier. Once it has arrived at the boundary with the anode, it reacts catalytically with the fuel gas, giving off heat and corresponding combustion products and surrendering two additional electrodes [sic] to the anode. A requirement for this is an electrically conductive connection between anode and cathode in which a current flow is created that can be used for operating different conductively connected systems.

The fuel cell device is thus a single fuel cell or a plurality of fuel cells, in particular in the form of a fuel cell stack.

A "gas-carrying duct" within the meaning of the present invention is in particular a tubular or hose-like device having an, at least for the most part, free, in particular elliptical or rectangular cross-sectional geometry, which is provided, in particular set up, to carry a gas from an upstream opening of the duct to a downstream opening of the duct, with at least essentially no gas escaping via a lateral surface of the duct. Examples for gas-carrying ducts within the meaning of the present invention include in particular separate pipes and/or hoses and/or an area of the housing that is physically separated from the interior space.

A "valve" within the meaning of the present invention is in particular a device that is provided, in particular set up, to at least at times provide a gas-carrying connection between a first side and a second side of the valve, in particular in only one direction of flow, in particular in the form of a check valve. Valves according to the invention may be in particular electric-motor-driven valves, electromagnetically actuated valves, valves actuated by a medium, in particular valves actuated by an internal medium or valves actuated by an external medium.

A "driving device" within the meaning of the present invention is in particular an externally driven turbo-engine that conveys and compresses a gaseous dispersion medium as well as generate a pressure gradient between an intake side and a pressure side of the driving device. Driving devices within the meaning of the present invention are in particular provided, in particular set up, to generate a pressure ratio between the intake side and pressure side between 1 and 3.

A "sensor device" within the meaning of the present invention is in particular a device that is provided, in particular set up, to detect a particular physical and/or chemical property and/or material quantity of its surroundings in terms of quality and/or quantity. The variables are detected by means of physical or chemical effects and transformed into an electrical signal that can be processed further. Sensor devices within the meaning of the present invention are in particular gas sensors for the detection of gaseous substances, in particular chemosensors. A sensor device within the meaning of the invention is in particular a heat tone sensor, the sensor effect being generated by the combustion of absorbent gases on the surface of a catalyst.

According to a preferred embodiment, the at least one parameter of the gas is a chemical component, in particular a quantity of a chemical component thereof. In particular, the gas comprises hydrogen, in particular, at least for the most part, formed of hydrogen. This is particularly advantageous because in this manner a certain quantity of a chemical component can be determined. According to a preferred embodiment, this information is used, in particular when a threshold value is exceeded, to carry out actions, in particular countermeasures or protective measures. According to a preferred embodiment, at least one parameter of the gaseous fuel of the fuel cell is detected that preferably comprises hydrogen, in particular is, at least for the most part, formed of hydrogen. In this manner, this gas, which is sometimes dangerous to devices and living things, in particular humans due to its reactivity and volatility, can be monitored.

According to an advantageous embodiment, the duct is arranged on a side of the interior space, in particular an upper side of the interior space in the installation position, and/or of the fuel cell device. This is particularly advantageous because in this way the low molecular weight of the gas, in particular the hydrogen, which accumulates in the upper area of the interior space and displaces the ambient air present there, is utilized. If the pressure in the interior space increases, the valve is opened and the gas molecules located in the vicinity of the valve, due to the preferred installation position an upper area of the interior space where the hydrogen has collected, escape from the interior space over into the duct and are supplied to the sensor device via the air flow in the duct. According to another advantageous embodiment, the valve is a unidirectional valve, which permits a gas transfer, at least for the most part, only from the interior space into the duct. This is particularly advantageous because in this way an undesired ingress of gaseous and/or liquid and/or solid environmental influences, in particular water, dust, dirt or the like, into the interior space is, at least for the most part, avoided. This contributes in particular to the robustness of the generator unit, which can thus also be used at increasingly sub-optimal installation sites. According to a preferred embodiment, further separate protection of the fuel cell device against splashing water and/or dirt and/or dust or the like is not required.

According to another advantageous embodiment, the valve has a membrane, which is in particular for the most part gas- and/or water-tight. This is particularly advantageous because in this manner an, at least for the most part, automatic valve is provided that can react to the internal pressure in the interior space without additional sensors and/or actuators and/or control electronics and, if necessary, allows a quantity of gas to escape from the interior space into the gas-carrying duct. A valve of this type is also cost-effective and/or robust in comparison to other alternatives.

According to another advantageous embodiment, the driving device has a fan and is in particular formed therefrom. A "fan" within the meaning of the present invention is in particular a turbo-engine that functions as a machine and has an externally driven impeller rotating in a fan housing. Impellers are in particular impeller wheels, bevel wheels, helical wheels or the like. The above definition of a fan includes in particular axial fans, diagonal fans, radial fans, centrifugal fans and tangential or cross-flow fans. This is particularly advantageous because in this manner an, at least for the most part, continuous and/or adjustable air flow can be created that is directed past at least one side of the fuel cell device.

According to another advantageous embodiment, the driving device is arranged in a downstream direction of the duct starting from the valve, in particular from the last valve as seen in the direction of flow. This is particularly advantageous because in this manner there is the advantage, in particular, at least for the most part, the guarantee, that the escaped gas must pass by the sensor.

According to another advantageous embodiment the generator unit also has a control device which is connected to the sensor device and the fuel cell device in a signal-carrying manner and provided, in particular set up, to send a control signal to the fuel cell device in the event that a threshold value, in particular one that is stored in the control device, is exceeded by the at least one parameter. This is particularly advantageous because in this manner a control circuit is closed that is formed from the sensor device as a measurement detector, the control device as a control element and the fuel cell device, in particular a component of the fuel cell device, as an actuator.

According to another advantageous embodiment, the control device is provided, in particular set up, to shut down, in particular switch off, the fuel cell device in the event that the threshold value is exceeded.

The control device preferably shuts down the fuel cell device and/or switches it off to prevent further gas leakage. Due to the fact that an escape of gas due to a leak can occur regardless of the current operational state of the fuel cell device, the control device is preferably also provided, in particular set up, to shut down a higher-level overall system, in particular a vehicle, and/or emit optical and/or acoustic and/or radio-based signals, in particular to a driver and/or the surroundings and/or a remote monitoring device.

According to another advantageous embodiment of the present invention, the generator unit also has an electronics module, which is arranged in the housing on a side of the duct that is in particular opposite the fuel cell device. This is particularly advantageous because the flow of a gas, in particular of ambient air, which is present anyway for gas determination, can additionally be used to cool further components by convection cooling. According to a preferred embodiment, the electronics module has power-electronic components that are preferably cooled because of their waste heat. Preferably, additional separate cooling of the electronics module can be omitted in this way. This is additionally or alternatively particularly advantageous because in this manner a structural unit is created that can act, at least for the most part, autonomously because an energy generating device in the form of the fuel cell device, a cooling and monitoring device in the form of the gas-carrying duct having the driving device and the sensor device, as well as the electronics module, in particular an electronic control and/or regulation unit and/or a voltage conversion, can be provided, which is connected to a higher-level overall system, at least for the most part, only via fuel medium supply lines, exhaust gas and waste water lines, control signal lines and current take-off lines.

According to another advantageous embodiment of the present invention, the electronics module has a voltage converter, in particular a DC/DC voltage converter. This is particularly advantageous because the output voltage of a fuel cell and/or a fuel cell stack generally does not correspond to the necessary output voltage, in particular of 12 V or 48 V.

For this reason, the output voltage of the fuel cell, which is a DC power source, is converted into a direct current having a changed voltage, in particular a higher voltage. A voltage converter of this type is an example of a power-electronic component of the type described above.

According to another advantageous embodiment, the electronics module has at least one cooling element, in particular at least one cooling fin, which extends at least partially into the duct. This is particularly advantageous because in this way a convection surface, which is increased for the gas flowing by, is provided that in particular increases the heat exchange between the electronics module and the gas flowing by. According to a further embodiment, the cooling fins can also pass through the duct and run out in a wall of the gas-carrying duct, which is, at least for the most part, opposite the electronics module. In addition to the cooling fins mentioned, embodiments having honeycomb-shaped or lamellar cooling structures also fall under the protective scope of this inventive idea.

According to another advantageous embodiment, the generator unit has a plurality of valves, the sensor unit being arranged in a downstream direction of the duct starting from the last of these valves as seen in the direction of flow. This is particularly advantageous because in this way a plurality of possibilities for gas passing from the interior space over into the duct are provided, which reduces the risk of the formation of non-detectable gas buildup.

According to another advantageous embodiment, a partition wall separates the interior space of the housing from the rest of the volume, which is delimited by the housing.

According to another advantageous embodiment, the fuel cell device has a reformer that is in particular provided, in particular set up, to provide the fuel cell device with a fuel adapted to its composition.

A "reformer" within the meaning of the present invention is in particular a device into which a fuel starting material, in particular natural gas and/or ethanol, in particular bio-ethanol and/or water mixed with ethanol, specifically bio-ethanol, is supplied and there converted into a fuel, in particular with the addition of heat, in particular a gas mixture comprising hydrogen, carbon dioxide and carbon monoxide. This is particularly advantageous because in this manner the fuel required to operate the fuel cell, in particular the gas mixture, does not have to be stored in this form from the outset, but can be stored in a more stable form and/or a form having a higher energy density and a conversion into the fuel is only created shortly—in particular, at least for the most part, immediately—before the reaction in the fuel cell.

An additional aspect of the present invention relates to a vehicle, in particular a land-bound vehicle, having a generator unit of the type described here. This is particularly advantageous because in this manner the advantages of the generator unit according to the invention, in particular the high energy efficiency, can be provided in particular for daily usage, such as for road transport, which can contribute to the reduction of pollutant emissions.

According to another advantageous embodiment, the vehicle also has a fuel reserve for the provision of fuel, in particular ethanol, in particular bio-ethanol, and/or water mixed with ethanol, in particular bio-ethanol, the fuel being supplied at least partially, in particular, at least for the most part, in particular completely, as a reserve for the operation of the fuel cell device.

"Bio-ethanol" within the meaning the present invention refers to ethanol that, at least for the most part, is produced from biomass or the biodegradable portions of waste. "Agricultural ethanol" is a term used synonymously with this.

According to a further aspect of the present invention, a method for monitoring a generator unit comprises the following steps:
 conducting gas in a gas-carrying duct along a fuel cell device of the generator unit;
 connecting an interior space of the fuel cell device to the duct through a valve in a gas-carrying manner;
 detecting at least one parameter of the gas by a sensor device that is arranged in a downstream direction of the duct starting from the valve;
 comparing the at least one parameter to a threshold value, which is in particular stored in a control device; and
 shutting down, in particular switching off, the fuel cell device when the threshold value is exceeded by the at least one parameter.

According to a further preferred embodiment of the method, it comprises the following step:
 conducting gas in a gas-carrying duct along an electronics module, in particular to cool the latter. To avoid repetition with regard to the advantages of this method and further embodiments, refer to the above statements, which likewise apply to the method.

BRIEF DESCRIPTION OF THE SEVERAL VIEWS OF THE DRAWINGS

Further features, advantages and applications of the present invention arise from the following description of various exemplary embodiments with reference to the drawings. In the drawing:

FIG. 1 an at least partially schematic view of a generator unit according to one aspect of the present invention in the installation position.

DESCRIPTION OF SPECIFIC EMBODIMENTS OF THE INVENTION

The generator unit 1 shown in FIG. 1 has: a housing 10, a fuel cell device 20, which is arranged in an interior space 10a of housing 10, a gaseous duct 30 having an upstream opening 30a and a downstream opening 30b, a valve 40, which is provided, in particular set up, to connect the interior space 10a to duct 30 at least at times in a gas-carrying manner, a driving device 50, which moves gas within the duct from upstream opening 30a in direction of flow S to a downstream opening 30b, and a sensor device 60, which is arranged in a downstream direction of duct 30 starting from valve 40 and is designed to detect at least one parameter of the gas. According to the embodiment in FIG. 1, gas-carrying duct 30 is designed inside of housing 10. Openings 30a, 30b of gas-carrying duct 30 are therefore simultaneously openings in housing 10. According to the embodiment in FIG. 1, a partition wall separates interior space 10a of housing 10 from the rest of the volume, which is limited by housing 10. According to the embodiment in FIG. 1, generator unit 1 has two valves 40. It should be noted at this point that it is obvious to the person skilled in the art that one valve or more than two valves can also be used without departing from the inventive idea of the present invention. The gas, in the present case preferably ambient air, enters gas-carrying duct 30 through upstream opening 30a. Driving unit 50, in particular in the form of a fan, generates a vacuum with respect to the surroundings within the gas-carrying duct, as a result of which ambient air is sucked in through upstream opening 30a and carried along gas-carrying duct 30 within housing 10 until it leaves housing 10 again through downstream opening 30b and in doing so passes sensor device 60, in particular in the form of a gas sensor.

According to the embodiment in FIG. 1, valves 40 are designed, at least for the most part, as gas- and/or water-tight membranes that only allow gas to pass from interior space 10a over into duct 30, but, at least for the most part, not in the reverse direction. Valves 40 also prevent—at least for the most part—ambient air, moisture, water and/or dirt from entering.

In the event that gas, in particular hydrogen, escapes from fuel cell device 20, this gas rises upwards in the installation position due to its molecular properties and accumulates there around valve 40. Here, the escaping gas displaces the gas, in particular ambient air, that was originally located in the area around valve 40, as a result of which the pressure in the interior space 10a of housing 10 increases. If the internal pressure in interior space 10a exceeds a predetermined limit value, which is, at least for the most part, predetermined by valve 40 and/or predetermined for it by means control technology, valve 40 opens up a gas-carrying passage between interior space 10a and gas-carrying duct 30. Because the gas that has escaped, in particular the hydrogen, has, at least for the most part, collected in the area around valve 40, this gas, in particular the hydrogen, is, at least for the most part, only discharged to the ambient air flowing by in the gas-carrying duct. The gas, in particular hydrogen, that has passed from interior space 10a over into duct 30, is carried along by the ambient air flowing by and supplied to sensor device 60. The latter is provided, in particular set up, to detect at least one parameter of the gas, in particular a chemical component of the gas, in particular a quantity of a chemical component thereof.

According to a preferred embodiment, the general presence of hydrogen is determined, in particular quantified.

Sensor device 60, which is connected to a control device 80 in a signal-carrying manner, evaluates the measurement result of sensor device 60, compares it in particular with predetermined threshold values, and, in the event that a threshold value is exceeded, sends a control signal to the fuel cell device 20 connected to control device 80 in a signal-carrying manner. Control device 80 is preferably arranged within housing 10, but in particular not necessarily within interior space 10a. To prevent an unguided escape of gas at downstream opening 30b of gas-carrying duct 30, an outlet device 10c is preferably provided on the housing, which guides the flow of gas—even outside of housing 10—at least in an area adjacent to housing 10, in particular until the gas flow has passed sensor device 60.

The embodiment depicted in FIG. 1 also has an electronics module 70 that is arranged in the housing on a side of duct 30 that is in particular opposite fuel cell device 20. Thus, the duct, which is bordered on one side at least partially by partition wall 10b, is bordered at least partially by electronics module 70 on the other side. The ambient air flowing by in direction of flow S cools electronics module 70 during convection cooling. This cooling effect is additionally increased by fitting at least one cooling fin 70a, as provided in the example of FIG. 1.

Although exemplary embodiments were discussed in the preceding description, it should be noted that a plurality of variations is possible. In addition, it should be noted that the exemplary embodiments are only examples, which should in no way limit the scope of protection, the applications or design in any way. Instead, the preceding description should give the person skilled in the art a guideline for the implementation of at least one exemplary embodiment, it being possible to undertake various changes, in particular with respect to the function and arrangement of the components described, without leaving the scope of protection that arises from the claims and these equivalent combinations of features.

LIST OF REFERENCE CHARACTERS

1 Generator unit
10 Housing
10a Interior space of housing 10
10b Partition wall
10c Outlet device
20 Fuel cell device
30 Gas-carrying duct
30a Upstream opening of gas-carrying duct 30
30b Downstream opening of gas-carrying duct 30
40 Valve
50 Driving device
60 Sensor device
70 Electronics module
70a Cooling element
80 Electronics module
S Direction of flow

What is claimed is:

1. A generator unit (1), comprising:
a housing (10);
a fuel cell device (20) that is arranged in an interior space (10a) of the housing (10);
a gas-carrying duct (30) having an upstream opening (30a) and a downstream opening (30b);
a valve (40) that is provided to connect the interior space (10a) to the duct (30) at least at times in a gas-carrying manner;
a driving device (50) that moves gas within the duct (30) from the upstream opening (30a) to the downstream opening (30b); and
a sensor device (60) that is arranged in a downstream direction of the duct (30) starting from the valve (40) and is set up to detect at least one parameter of the gas;
wherein the valve (40) is a unidirectional valve that permits a gas transfer, at least for the most part, only from the interior space (10a) into the duct (30).

2. The generator unit according to claim 1, wherein the at least one parameter of the gas is a chemical component.

3. The generator unit according to claim 1, wherein the duct (30) is arranged on a side of the fuel cell (20).

4. The generator unit according to claim 1, wherein the valve (40) has a membrane.

5. The generator unit according to claim 1, wherein the driving device (50) has a fan.

6. The generator unit according to claim 1, wherein the driving device (50) is arranged in a downstream direction of the duct starting from the valve (40).

7. The generator unit according to claim 1, further comprising a control device (80), which is connected to the sensor device (60) and the fuel cell device (20) in a signal-carrying manner and provided to send a control signal to the fuel cell device (20) in the event that a threshold is exceeded by the at least one parameter.

8. The generator unit according to claim 7, wherein the control device (80) is provided, in particular set up, to shut off the fuel cell device (20) in the event that a threshold value is exceeded.

9. The generator unit according to claim 1, further comprising an electronics module (70), which is arranged in the housing (10) on a side of the duct (30).

10. The generator unit according to claim 9, wherein the electronics module (70) has a voltage converter.

11. The generator unit according to claim 1, wherein the fuel cell device (20) has a reformer.

12. A vehicle having the generator unit (1) of claim 1.

13. The vehicle according to claim 12, further comprising a fuel reserve for the provision of fuel.

14. The vehicle according to claim 13, comprising fuel that is at least ethanol, bio-ethanol or water mixed with ethanol, the fuel being supplied at least partially as a reserve for the operation of the fuel cell device.

15. A method for monitoring the generator unit (1) of claim 1, wherein the method comprising:
- conducting gas in the gas-carrying duct along the fuel cell device of the generator unit;
- connecting the interior space of the fuel cell device to the duct through the valve in a gas-carrying manner;
- detecting the at least one parameter of the gas by the sensor device that is arranged in the downstream direction of the duct starting from the valve;
- comparing the at least one parameter to a threshold value;
- shutting down the fuel cell device when the threshold value is exceeded by the at least one parameter.

16. The method according to claim 15, further comprising the step: conducting gas in the gas-carrying duct along an electronics module.

17. A generator unit (1), comprising:
- a housing (10);
- a fuel cell device (20) that is arranged in an interior space (10a) of the housing (10);
- a gas-carrying duct (30) having an upstream opening (30a) and a downstream opening (30b);
- a valve (40) that is provided to connect the interior space (10a) to the duct (30) at least at times in a gas-carrying manner;
- a driving device (50) that moves gas within the duct (30) from the upstream opening (30a) to the downstream opening (30b);
- a sensor device (60) that is arranged in a downstream direction of the duct (30) starting from the valve (40) and is set up to detect at least one parameter of the gas; and
- an electronics module (70), which is arranged in the housing (10) on a side of the duct (30)
- wherein the electronics module (70) has at least one cooling element (70a) which extends at least partially into the duct.

18. A generator unit (1), comprising:
- a housing (10);
- a fuel cell device (20) that is arranged in an interior space (10a) of the housing (10);
- a gas-carrying duct (30) having an upstream opening (30a) and a downstream opening (30b);
- a valve (40) that is provided to connect the interior space (10a) to the duct (30) at least at times in a gas-carrying manner;
- a driving device (50) that moves gas within the duct (30) from the upstream opening (30a) to the downstream opening (30b); and
- a sensor device (60) that is arranged in a downstream direction of the duct (30) starting from the valve (40) and is set up to detect at least one parameter of the gas;
- wherein the generator unit (1) has a plurality of valves (40) and the sensor device (60) is arranged in a downstream direction of the duct (30) starting from the last valve (40) as seen in a direction of flow (S).

* * * * *